Dec. 14, 1943.                A. E. MAGUIRE                 2,336,742
                        EDUCATIONAL MULTIPLYING DEVICE
                            Filed Dec. 5, 1941
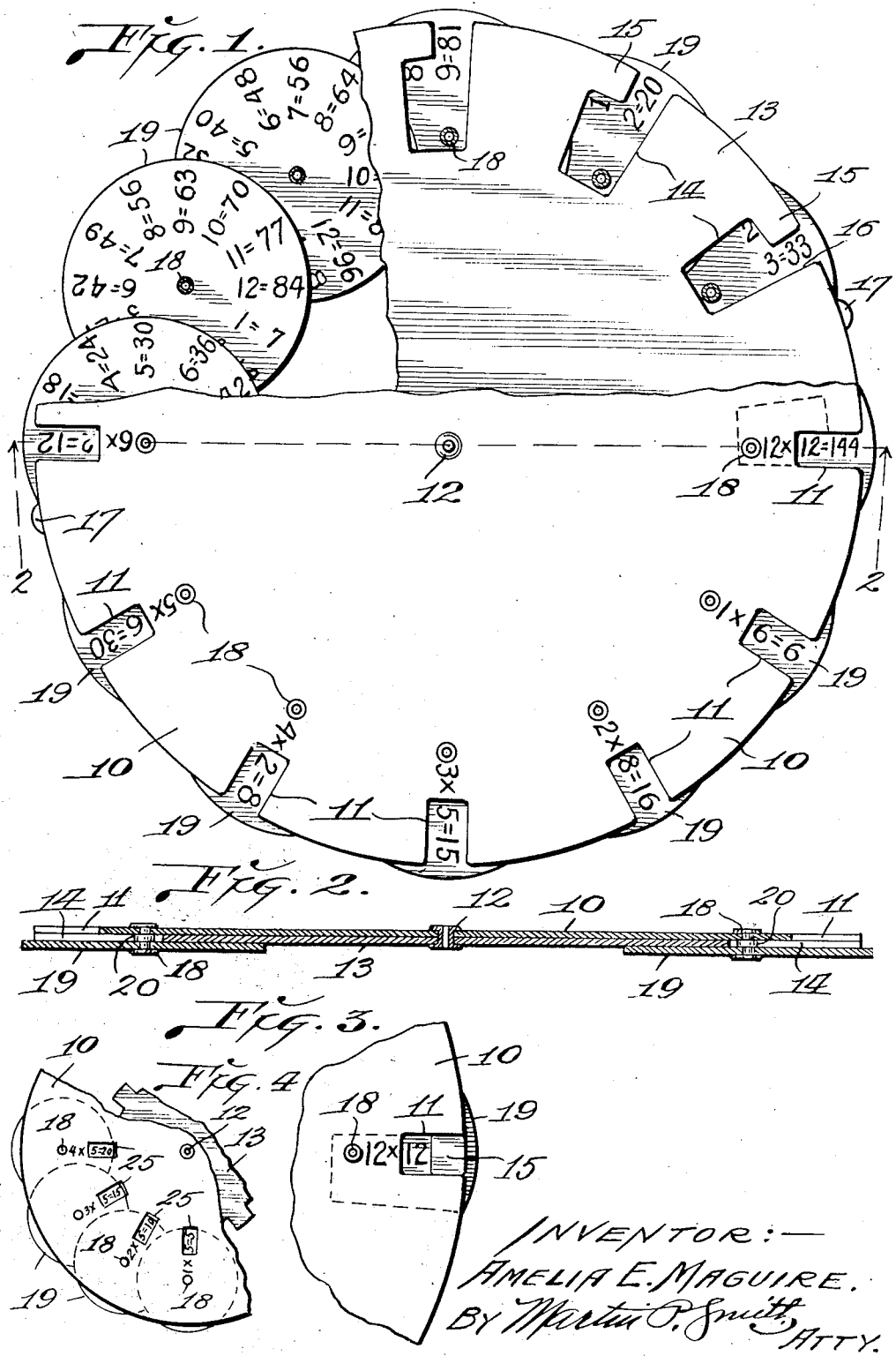

Patented Dec. 14, 1943

2,336,742

UNITED STATES PATENT OFFICE 2,336,742

EDUCATIONAL MULTIPLYING DEVICE

Amelia E. Maguire, Venice, Calif.

Application December 5, 1941, Serial No. 421,740

1 Claim. (Cl. 35—74)

My invention relates to a manually operable educational device and has for its principal object, the provision of a relatively simple, practical, and inexpensive device comprising a plurality of associated discs, certain of which are mounted for rotation on a single large disc, and the rotatable discs bearing numbers which show the results of the multiplication of figures representing multiplicands that appear on the face of the larger disc by figures representing multipliers and which latter appear on the rotatably mounted discs.

A further object of my invention is to provide a multiplying device that includes a disc provided in its edges with notches, with tabs projecting into said notches, said disc being mounted for rotation on the upper or front disc that bears the figures representing the multiplicands and which notched disc may be rotated a short distance so as to bring the tabs thereon into position overlying the figures representing the results on the small rotatably mounted discs, thus covering or blocking out said results in order to increase the efficiency of the device when used for teaching multiplication.

A further object of my invention is to provide a device of the character referred to that may function as an interesting and instructive plaything, as well as a device for teaching multiplication in schools and the like.

A further object of my invention is to provide an educational device which may by change of certain printed characters on the discs, be used for teaching division.

With the foregoing and other objects in view, my invention consists in certain novel features of construction and arrangement of parts that will be hereinafter more fully described and claimed and illustrated in the accompanying drawing in which:

Fig. 1 is a top plan view of an educational multiplying device constructed in accordance with my invention, with parts thereof broken away in order to more clearly illustrate certain parts that are covered by the upper or front disc.

Fig. 2 is a cross section taken on the line 2—2 of Fig. 1.

Fig. 3 is a detail view showing the under or lower disc of the device shifted so that the tabs carried thereby cover the numerals designating the results and which numerals are printed on the rotating discs.

Fig. 4 is a fragmentary plan view illustrating a modified construction.

Referring by numerals to the accompanying drawing which illustrate a preferred embodiment of my invention and which may be used for multiplying numbers from 1 to 12 inclusive, 10 designates a disc composed of thin, fairly stiff material, such as cardboard, Celluloid, or any of the commercial plastics now on the market, and formed in the marginal portion of this disc and extending inwardly from the edge thereof are rectangular notches 11 spaced equal distances apart. Seated in the center of disc 10 is a pivot 12, preferably a tubular rivet, and mounted to rotate freely thereupon is a disc 13 of thin material, the diameter of which is substantially equal to the diameter of the disc 10.

Formed in the marginal portion of the rotatably mounted disc 13 and spaced equal distances apart are notches 14 and projecting from one side of each notch adjacent the periphery of the disc is a tab 15, and the width of these tabs is approximately equal to one-half the length of the notches 11 in disc 10. The width of the space 16 between the end of each tab 15 and the edge of notch 14 opposite the edge from which said tab projects is substantially equal to the width of the notches 11. Thus when the disc 13 is shifted so that the spaces 16 coincide with the outer portions of the notches 11, the tabs 15 close the outer portions of the notches 11 in disc 10.

Formed on the edge of disc 13 are one or more small projections such as 17 which may be engaged by the finger for rotating said disc.

Seated in the disc 10 at short distances inwardly from the inner ends of the notches 11 are pivots 18, preferably tubular rivets, and mounted to rotate freely on the lower ends of said pivots immediately beneath the disc 13 is a series of small discs 19 that bear on their upper faces the numbers designating the multipliers and the results of multiplication processes.

Formed integral with the central portion of the shank of each of these pivots 18 is a small rib or flange 20 which serves to maintain the discs 19 in spaced relation with respect to the disc 10 for the accommodation of the disc 13. The pivot members 18 extend through the notches 14 in disc 13 and said pivot members which are engaged by the side edges of the notches 14 as disc 13 is shifted from one position to another, serve as stops to limit the rotary movement of said disc 13.

Appearing on the upper faces of the rotating discs 19 adjacent their peripheries and spaced equal distances apart are numbers representing the results of multiplication and appearing on the same faces of said discs inwardly from the numbers indicating the results are numbers indicating the multipliers. Appearing between the numbers representing the multipliers and the numbers representing the results are the short parallel lines that represent "equal" in mathematical computations.

Appearing on the upper face of the disc 10 between the pivot members 18 and the inner ends of the notches 11 are the numbers representing multiplicands that are followed by the character × representing "times" in multiplication.

For teaching the standard multiplication table, it will be understood that twelve of the small rotating discs 19 are used and that the numerals designating the multipliers and the results that appear thereon run from 1 to 12 respectively. In other words, the disc having the numerals designating the multipliers from 1 to 12 inclusive and the numerals representing the results from 12 to 144 inclusive is mounted on the pivot 18 that is adjacent the numerals representing the multiplicand that appears on the face of disc 10 adjacent said pivot, and this arrangement is carried out in the eleven other rotating discs 19.

Thus the device equipped with twelve rotating discs 19 and which latter bear on their upper faces the multipliers and results of multiplication, may be conveniently utilized for the multiplication of all numbers from 1 to 12 inclusive. If desired, the size of the discs 10 and 13 may be increased in order to accommodate an increased number of the small rotating discs 19, thereby increasing the multiplying capacity of the device.

In the use of the multiplying device, the discs 19 are rotated so as to successively bring the multipliers and results that appear on the faces thereof into position directly below the notches 11 and thus the student may readily observe the results attained by multiplication of the numbers designating the multiplicands which appear on the face of the disc 10 adjacent the inner ends of the notches 11.

During the instruction periods, the teacher or student may engage one of the studs or projections 17 and rotate the disc 13 so as to position the tabs 15 across the outer portions of the notches 11, thereby covering all of the numerals on the discs 19 that represent the results of multiplication, and thus the student may be required to give the results subsequent to learning the same, before the disc 13 was rotated to cover the printed results (see Fig. 3).

By slight variation of the numbers printed on the discs 10 and 19 and correspondingly changing the arithmetical signs following the numbers printed on the disc 10, my improved device may be used for teaching to a limited degree problems in addition, subtraction, and division.

In the modified construction illustrated in Fig. 4, the disc 10 is provided inwardly from the pivots 18 that provide axes for the discs 19 with a circular row of radially disposed slots 25 that provide sight openings through which the numbers printed on the discs 19 are readily visible and which arrangement eliminates the notching of the marginal portion of said disc 10. Where such construction is employed, the numbers representing the multiplicands are located between the pivots 18 and the slots 25.

Thus it will be seen that I have provided an educational multiplying device that is relatively simple in construction, inexpensive of manufacture, and very effective in performing the functions for which it is intended, namely, the teaching of multiplication and particularly the standard multiplication table.

It will be understood that minor changes in the size, form and construction of the various parts of my improved educational multiplying device, may be made and substituted for those herein shown and described, without departing from the spirit of my invention, the scope of which is set forth in the appended claim.

I claim as my invention:

In an educational multiplying device, a disc provided in its marginal portion with radial notches, a series of small discs mounted for rotation on the under side of said first mentioned disc, portions of which small discs are visible through the notches in said first mentioned disc, said first mentioned disc bearing on its upper face adjacent the inner ends of the notches therein, numbers that represent multiplicands, the upper faces of the small discs bearing circular rows of figures representing multipliers and results that are complementary to the multiplicands appearing on the face of said first mentioned disc, which multipliers and results are successively visible through the notches in said first mentioned disc as said small discs are rotated, means for spacing the small discs apart from the underface of said first mentioned disc a disc co-extensive with said first mentioned disc and mounted for rotation upon the center thereof, the outer portion of which rotatively mounted disc is positioned between said small discs and the outer portion of the first mentioned disc, said rotative disc being provided in its outer portion with a series of spaced radial notches, the width of the inner portions of which radial notches and the axes for the small discs, limit the rotative movement of rotative disc relative to the first mentioned disc and a tab projecting from the outer portion of the edge at one side of each notch in said rotative disc for covering the result appearing on the upper face of the adjacent small disc.

AMELIA E. MAGUIRE.